(12) United States Patent
Andersson et al.

(10) Patent No.: US 10,811,941 B2
(45) Date of Patent: Oct. 20, 2020

(54) ELECTRIC MACHINE

(71) Applicant: Bombardier Transportation GmbH, Berlin (DE)

(72) Inventors: Svante Andersson, Västerås (SE); Åsa Sandberg, Västerås (SE)

(73) Assignee: Bombardier Transportation GmbH, Berlin (DE)

( * ) Notice: Subject to any disclaimer, the term of this patent is extended or adjusted under 35 U.S.C. 154(b) by 233 days.

(21) Appl. No.: 16/066,546

(22) PCT Filed: Jun. 20, 2017

(86) PCT No.: PCT/EP2017/065059
§ 371 (c)(1),
(2) Date: Jun. 27, 2018

(87) PCT Pub. No.: WO2017/220560
PCT Pub. Date: Dec. 28, 2017

(65) Prior Publication Data
US 2019/0157946 A1    May 23, 2019

(30) Foreign Application Priority Data

Jun. 21, 2016  (SE) ...................................... 1650876

(51) Int. Cl.
*H02K 11/27* (2016.01)
*H02K 21/02* (2006.01)
*H02K 1/12* (2006.01)

(52) U.S. Cl.
CPC .............. *H02K 11/27* (2016.01); *H02K 1/12* (2013.01); *H02K 21/028* (2013.01); *H02K 2213/06* (2013.01)

(58) Field of Classification Search
CPC ........ H02K 11/27; H02K 1/12; H02K 21/028; H02K 2213/06
See application file for complete search history.

(56) References Cited

U.S. PATENT DOCUMENTS

2004/0251765 A1   12/2004  Dooley et al.
2008/0238217 A1*  10/2008  Shah ........................ H02K 1/16
                                                         310/11
2008/0238220 A1   10/2008  El-Rafaie et al.
(Continued)

FOREIGN PATENT DOCUMENTS

DE   10 2014 212872 A1   1/2016
EP        1 220 427 A2   7/2002
JP        2007-221881 A  8/2007

*Primary Examiner* — Jue Zhang
(74) *Attorney, Agent, or Firm* — Dilworth & Barrese, LLP

(57) ABSTRACT

An electric machine (1) has a stator (2) with a stator body (3) and a stator winding (4) and a rotor (5) rotatably disposed with respect to the stator and having a rotor body (6) with a plurality of permanent magnets received therein. The rotor is disposed with an air gap (14) between the rotor body and the stator body and to make a magnetic flux to pass between the permanent magnets of the rotor body and stator poles of the stator body through this air gap. The machine further comprises at least one member (15, 16) or an agent of a material having a high magnetic permeability configured to be positioned with respect to the stator body (6) so as to reduce the magnetic flux (A) from the permanent magnets through said air gap.

3 Claims, 16 Drawing Sheets

(56) References Cited

U.S. PATENT DOCUMENTS

| | | | | |
|---|---|---|---|---|
| 2012/0274164 A1* | 11/2012 | Zrno | ................... | H02K 19/24 |
| | | | | 310/114 |
| 2015/0061426 A1* | 3/2015 | Nagumo | ............... | H02K 5/225 |
| | | | | 310/58 |
| 2018/0026496 A1* | 1/2018 | Zhi | ..................... | H02K 11/25 |
| | | | | 310/68 B |

* cited by examiner

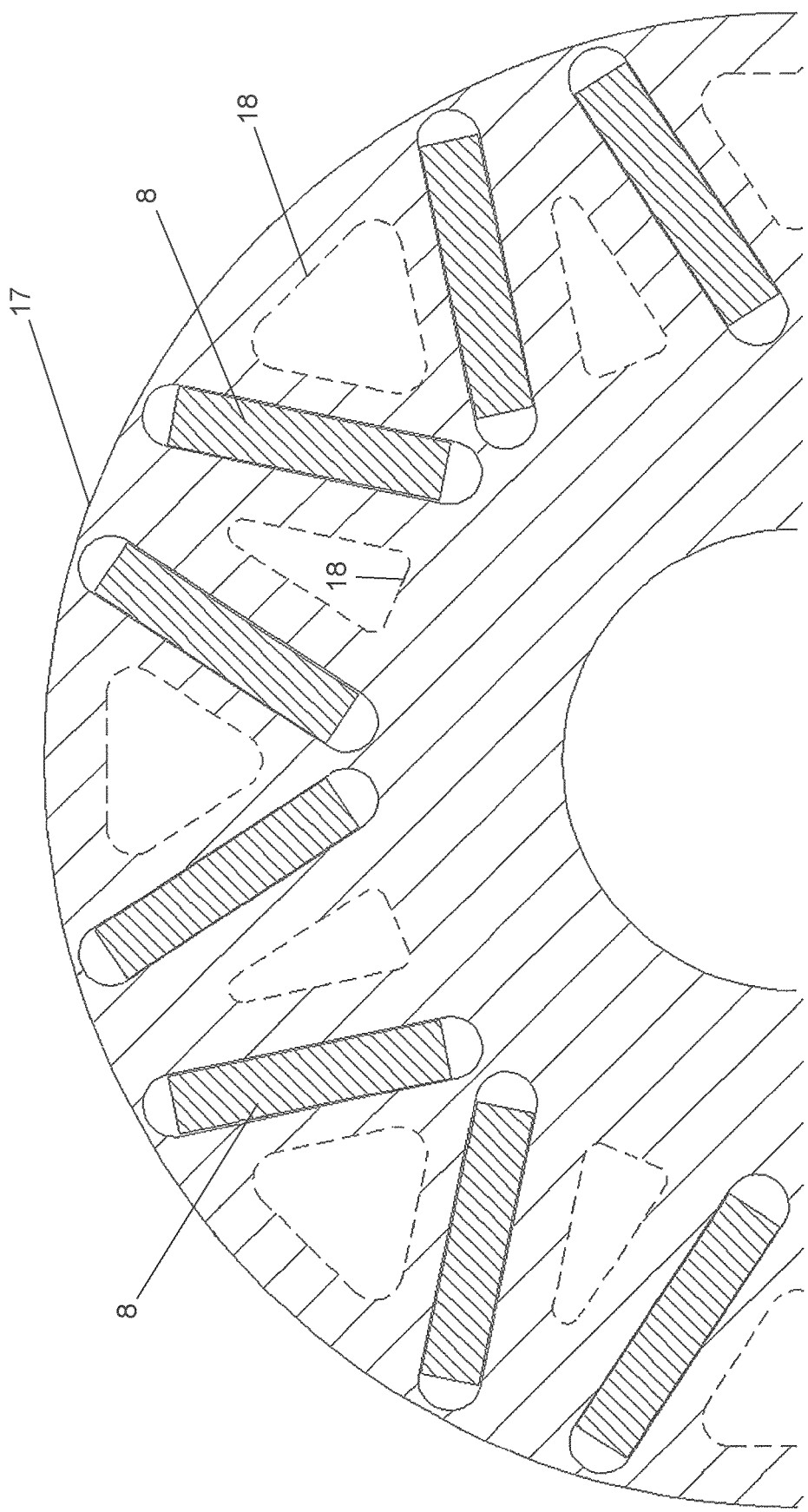

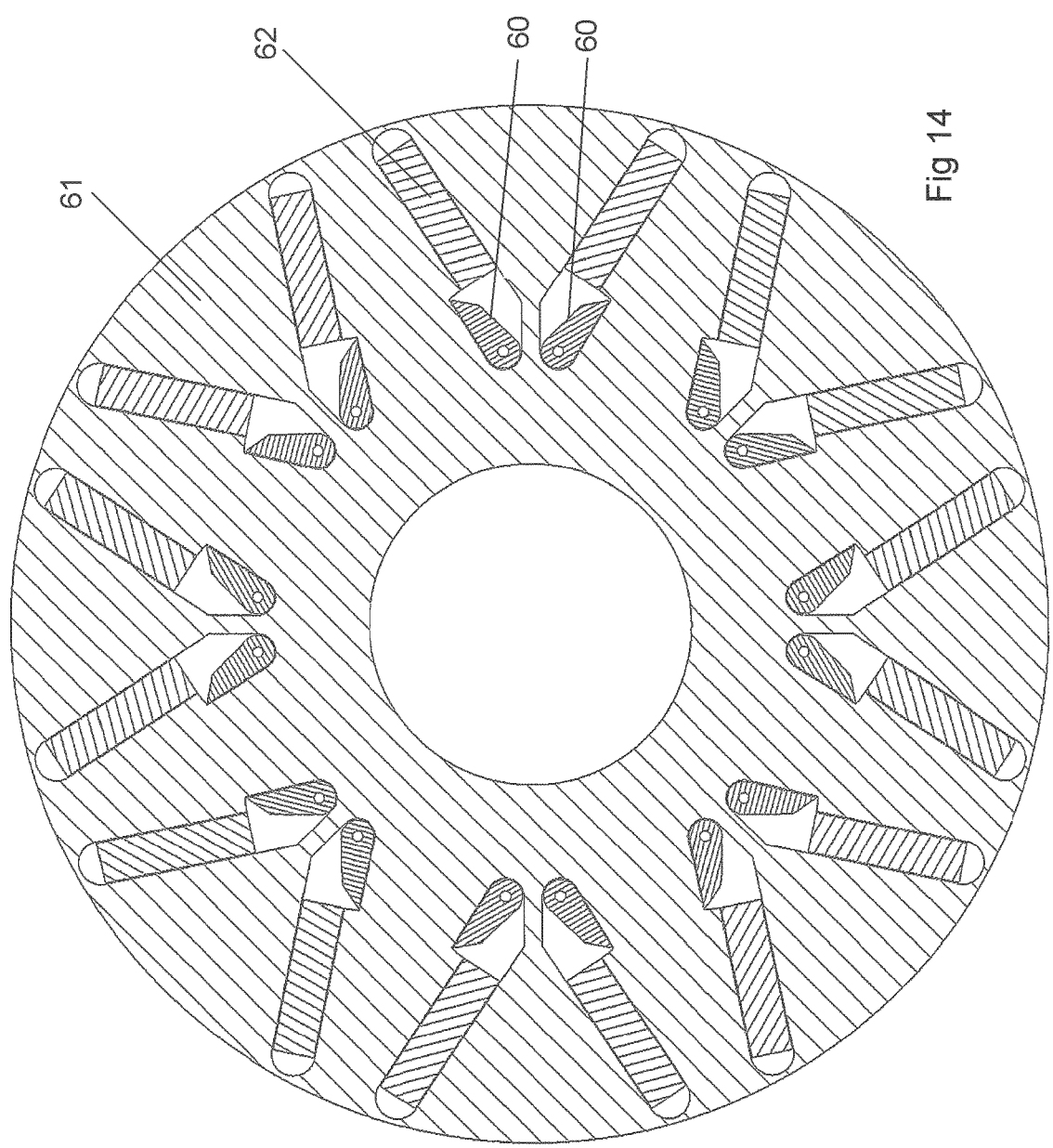

ELECTRIC MACHINE

TECHNICAL FIELD OF THE INVENTION AND BACKGROUND ART

The present invention relates to an electric machine comprising:
- a stator having a stator body with a stator winding wound therearound and configured to electrically create a plurality of stator poles disposed around the periphery of the stator body,
- means configured to connect the stator winding to an AC source or receiver, and
- a rotor rotatably disposed with respect to the stator and having a rotor body with a plurality of permanent magnets received therein,
- said rotor being disposed with an air gap between the rotor body and the stator body and to make a magnetic flux to pass between the permanent magnets of the rotor body and the stator poles of the stator body through said air gap so as to apply a driving torque to the rotor in motor operation of the electric machine and feeding electric power to the stator winding in generator operation of the electric machine.

Such an electric machine may operate as motor and/or generator, although this disclosure will focus mainly on the operation thereof as a motor. Furthermore, the electric machine may have said air gap directed radially or axially for being a radial or axial magnetic flux machine.

By using a plurality of permanent magnets to produce the magnetic flux of the rotor a synchronous motor is achieved. Such a motor has lower rotor losses compared to an induction motor and thus higher efficiency. It can also be built with a higher pole number, compared to an induction motor, without sacrificing performance, so that it can have a higher torque capability aimed at.

The present invention is particularly applicable to electric machines in the form of motors of the type defined in the introduction for creating a traction force of a track-bound vehicle, especially a rail vehicle, but when discussing this application of the invention hereinafter that shall not be interpreted as a restriction of the invention thereto. Such a motor, which of course may function as a generator when braking the vehicle, is particularly advantageous for such a vehicle for which a high torque capability with respect to a determined size of the motor is an important feature.

A high magnetic flux through said air gap from the permanent magnets in the rotor body of a permanent magnet electric machine of the type defined in the introduction acting as a motor results in that the motor requires less current to produce the required torque below base speed, which is a speed of approximately half the maximum number of revolutions of the rotor. The iron losses at no load, i.e. when the current is zero, would be reduced if the permanent magnet flux is reduced. In some cases it is beneficial to be able to reduce the permanent magnet flux above base speed also when the motor also produces torque. A high magnetic flux through said air gap from the permanent magnets will result in a high no-load voltage at maximum speed resulting in ageing of the insulation of the stator winding and increasing the risk for arcing. Such arcing is a potential show-stopper for a permanent magnet motor due to remaining risk and/or the impact of competitiveness of layout and design requirements. Occurrence of arcing in the stator winding is presently mitigated by speed reduction, which for a track-bound vehicle electric machine means decelerating the train to a low speed. A high such magnetic flux from the permanent magnets through the air gap will also contribute to a higher short-circuit current, which in case of a 2-phase short-circuit will contribute to a higher oscillating torque.

SUMMARY OF THE INVENTION

The object of the present invention is to provide an electric machine of the type defined in the introduction being improved in at least some aspect with respect to known such electric machines. This object is according to the invention obtained by providing such an electric machine with the features herein.

A reduction of the magnetic flux from the permanent magnets through the air gap is in the electric machine according to the invention obtained by providing the machine with said at least one member or an agent of a material having a high magnetic permeability configured to be positioned with respect to the rotor body so as to reduce the magnetic flux from the permanent magnets through the air gap. This means that magnetic flux from the permanent magnets will thanks to said at least member or agent to a lower degree cross said air gap between the rotor body and the stator body than in absence of such a member or agent. The disadvantages of a high magnetic flux from the permanent magnets through said air gap mentioned above may by this be avoided. Furthermore, said at least one member is configured to reduce the magnetic flux from the permanent magnets through said air gap by diverting a part of the magnetic flux otherwise led from the permanent magnets through said air gap to instead be led through this member. To position a said member of a material having a high magnetic permeability to divert a part of magnetic flux from the permanent magnets constitutes an efficient, simple and reliable way of obtaining a substantial reduction of said magnetic flux through the air gap when desired. Additionally, said member is moveable with respect to the rotor body between at least two different positions in which the member is configured to divert differently large proportions of said magnetic flux from the permanent magnets therethrough. This movability makes it possible to have a high magnetic flux from the permanent magnets through the air gap when this is really favourable and still be able to reduce this magnetic flux when a high magnetic flux is undesired and/or harmful. The electric machine comprises means configured to move said at least one member between said different positions with respect to the rotor body, which provides for an easy adaption of the magnetic flux from the permanent magnets through said air gap to the operating conditions of the electric machine prevailing. Finally, said means is configured to move said at least one member to a position with respect to the rotor body with a maximum reduction of magnetic flux through said air gap upon creation of arcing or a short-circuit in said stator winding or any cables or equipment connected to said stator winding. The negative consequences of arcing mentioned above may by this be efficiently addressed.

EP 1 220 427 A2 discloses an electric machine of the type defined in the introduction in which an annular member is used for regulating the magnetic flux density in teeth of the stator body of the machine by movement of this annular member with respect to the stator.

According to an embodiment of the invention said member or agent is in normal operation held in a position with respect to the rotor body with a minimum reduction of magnetic flux through said air gap by a mechanism that is released upon creation of arcing or a short-circuit in said stator winding or any cables or equipment connected to said stator winding. Said means for moving the member uses a force, acting on the member in a direction that will move it to the position with less magnetic flux through the air gap when the member is released.

According to another embodiment of the invention said force is a magnetic attraction force.

According to another embodiment of the invention said member or agent is rotating with said rotor and said force is a centrifugal force.

According to another embodiment of the invention said means is temperature dependent and configured to move said at least one member with respect to the rotor body for diverting an increased portion of magnetic flux therethrough upon a decreasing temperature thereof. This feature provides compensation for the fact that the magnetic flux from the permanent magnets is higher for lower temperatures than for higher temperatures.

According to another embodiment of the invention said means is configured to move said at least one member by reacting chemically by being made of either an explosive material or of a substance reacting chemically while rapidly increasing its volume. This constitutes an option to rapidly moving said member and reduce the magnetic flux from the permanent magnets through said air gap when needed, and this movement will then only be made once in said electric machine before an interruption of the operation of the electric machine.

According to another embodiment of the invention the electric machine comprises a control unit configured to control said means to move said at least one member during operation of the electric machine for changing the proportion of said magnetic flux from the permanent magnets led through said air gap. The arrangement of such a control unit makes it possible to easily adjust the magnetic flux from the permanent magnets through said air gap to the operating conditions prevailing for the electric machine.

According to another embodiment of the invention said at least one member is made of a material having a magnetic permeability of $\geq 10\mu_0$ ($\mu_0$=magnetic permeability of vacuum).

According to another embodiment of the invention said at least one member is a ring configured to be positioned concentrically around a rotation axis of the rotor with respect to the rotor body so as to divert magnetic flux from the permanent magnets to be led through this ring instead of through said air gap. Such a ring may have any shape but is preferably circular.

According to another embodiment of the invention said ring is made of laminated magnetic steel or soft magnetic composites. This will keep eddy-currents induced by the magnetic flux through the ring and the rotation of the rotor body with respect to the ring at a low level.

According to another embodiment of the invention said rotor is rotatably disposed within the stator and said air gap between the rotor body and the stator body is directed radially with respect to a rotation axis of the rotor. Thus, the electric machine is a radial magnetic flux machine.

According to another embodiment of the invention the electric machine comprises a said ring at one axial end or both axial ends of the rotor body radially close to said air gap. Rings at these locations will reduce the magnetic flux from the permanent magnets through said air gap by diverting a part thereof to go through said ring (s) instead, and the size of this part may easily be modified by moving the ring axially with respect to a rotation axis of the rotor, which is the subject of another embodiment of the invention.

According to another embodiment of the invention said ring is configured to be attached on an axial surface of the rotor body by magnetic forces and to rotate with the rotor body. The ring may in this case be made of a solid material, since there will not exist any problem with eddy-currents by the fact that the ring will not move with respect to the magnetic flux when the rotor body is rotating.

According to another embodiment of the invention the rotor body and the stator body are arranged to have said air gap directed axially therebetween with respect to a rotation axis of the rotor and said at least one member is arranged close to said air gap. Thus, this electric machine is a so-called axial magnetic flux machine. According to an embodiment constituting further development of this embodiment the rotor body has an annular part and a said ring is arranged along and within said annular part of the rotor body and/or along and outside said annular part of the rotor body. Such a ring or rings with such a location may efficiently divert a part of the magnetic flux from the permanent magnets of the rotor to go through said ring instead of through said air gap.

According to another embodiment of the invention each said ring is movable axially with respect to a rotation axis of the rotor with respect to the rotor body towards and away from said air gap for diverting differently large proportions of said magnetic flux from the permanent magnets therethrough.

According to another embodiment of the invention, at least one said ring is divided in at least two parts moveable radially with respect to a rotation axis of the rotor with respect to the rotor body towards and away from said rotor body for diverting differently large proportions of said magnetic flux from the permanent magnets therethrough.

According to another embodiment of the invention directed to the arcing problem the machine comprises a said agent comprising a ferromagnetic powder stored in a container inside a casing enclosing the stator and the rotor and configured to be released upon occurrence of arcing to reach the region of said air gap for reducing magnetic flux through the air gap by bridging magnetic poles of the permanent magnets of the rotor. This constitutes an efficient way of rapidly stop arcing when occurring. The electric machine may then be restored to a normal condition by dismounting and cleaning while minimizing destruction of components thereof through said arcing.

According to another embodiment of the invention said at least one member is arranged inside said rotor and movable with respect to permanent magnets of the rotor so as to change the magnetic flux through said air gap by varying how much magnetic flux from the permanent magnets is lost in the rotor body due to leakage.

The invention also relates to use of an electric machine according to the invention in a driving arrangement for generating a traction force of a track-bound vehicle as well as a track-bound vehicle having a driving arrangement for generating a traction force of the vehicle including at least one electric machine according to the present invention. The advantageous features and the advantages of such a use and vehicle appear clearly from the above discussion of the different embodiments of an electric machine according to the present invention.

Further advantages as well as advantageous features of the invention will appear from the following description.

BRIEF DESCRIPTION OF THE DRAWINGS

With reference to the appended drawings, below follows a specific description of embodiments of the invention cited as examples.

In the drawings:

FIGS. 4a and 4b is a schematic view illustrating suitable areas to introduce high permeability material in the of end plates of the rotor body of the rotor in the electric machine shown in FIGS. 1 and 3, in case the end plates are made from a low permeability material, FIG. 14 is a simplified cross-section view of a part of the rotor body of an electric machine according to a sixth embodiment of the invention, where the moveable members are in a position to divert less flux by leakage.

DETAILED DESCRIPTION OF EMBODIMENTS OF THE INVENTION

Figure 1:
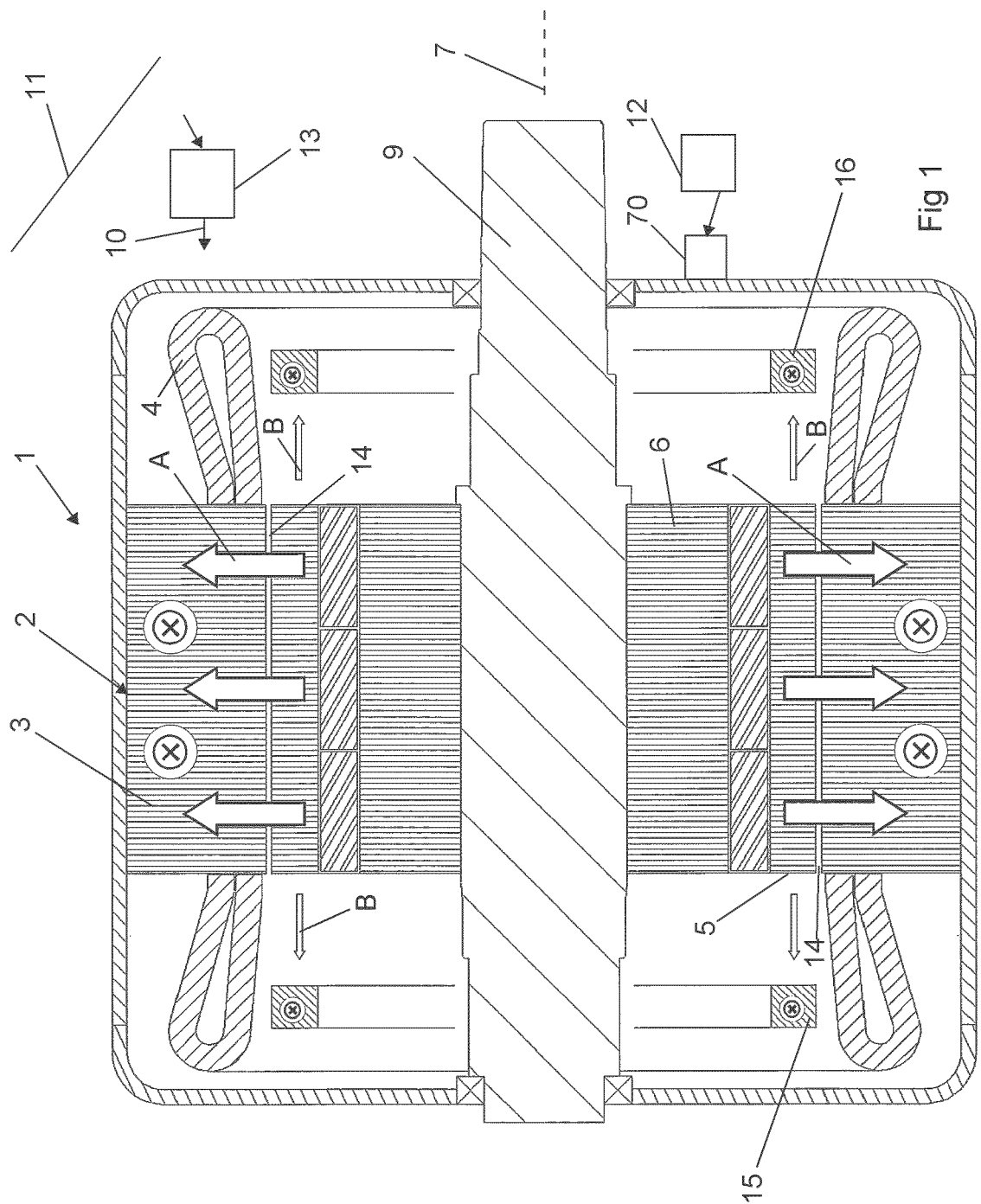
FIG. 1 is a schematic view of an electric machine according to a first embodiment of the invention in longitudinal cross-section with rings used to divert magnetic flux from the permanent magnets to not be led through a said air gap in a first position diverting only a small proportion of said magnetic flux.

FIG. 1 shows schematically the main parts of an electric machine 1 according to a first embodiment of the invention. This electric machine has a stator 2 having a stator body 3 with a stator winding 4 wound therearound and configured to electrically create a plurality of stator poles disposed around the inner periphery of the stator body. The stator winding is received in radial slots in the stator body extending over the entire length of this body. The total number of slots and number of slots per pole may be any conceivable, but as an example these numbers may be 48 and 4.

Figure 2B:
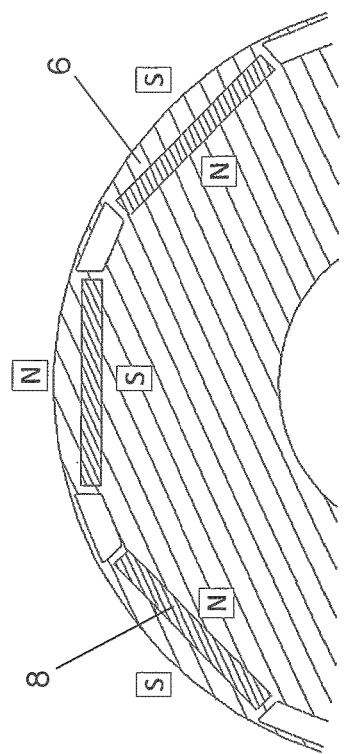
FIGS. 2a and 2b are schematic views illustrating possible arrangement of permanent magnets in the rotor of an electric machine according to FIG. 1.
Figure 2A:
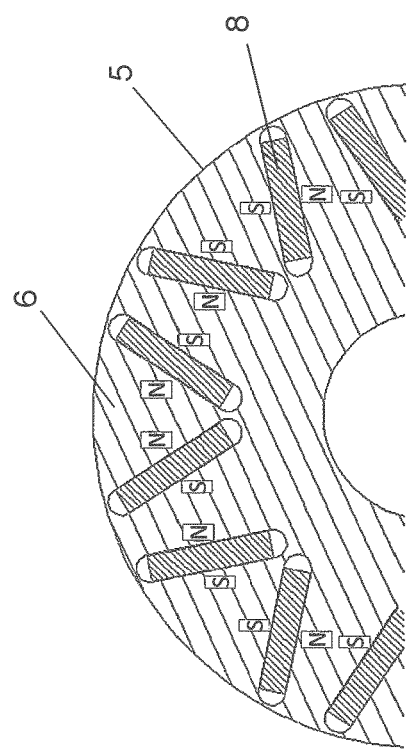

The electric machine further comprises a rotor 5 (see also FIGS. 2a and 2b) with a rotor body 6, which could be made of a solid high permeability material or could be, as the stator body, made of a laminated assembly of mutually electrically insulated angular plates of magnetic steel axially stacked with respect to an axis of rotation 7 of the rotor for keeping eddy current losses in these bodies at low levels and the rotor body 5 has magnets 8 mounted on the surface of the rotor or magnets mounted in the interior of the rotor as illustrated in FIGS. 2a and 2b.

In case of surface mounted magnets it is favourable to have pieces of high permeability material outside the magnets as shown in FIG. 2b in order to better be able to divert the flux from the airgap.

The rotor body 6 is rigidly connected with respect to rotation to a rotor axle 9 which is to be connected to for instance a wheel axle of a vehicle, possibly through a gear box.

It is also indicated how the electric machine has means 10 configured to connect the stator winding 4 to an AC-source or receiver, which in the case of a track-bound vehicle electric machine is an AC-supply line or diesel driven generator of the vehicle 11 schematically indicated. However, any type of AC-source is conceivable, and the alternating current may very well be created by an inverter connected to a direct voltage source on the other side thereof and for instance controlled according to a Pulse Width Modulation pattern. The box 12 in FIG. 1 indicates control equipment for the electric machine, such as a converter, and said AC-source is here indicated by the box 13. "AC-receiver" refers in this disclosure to the case of an electric machine operating in the generator mode.

Figure 3:
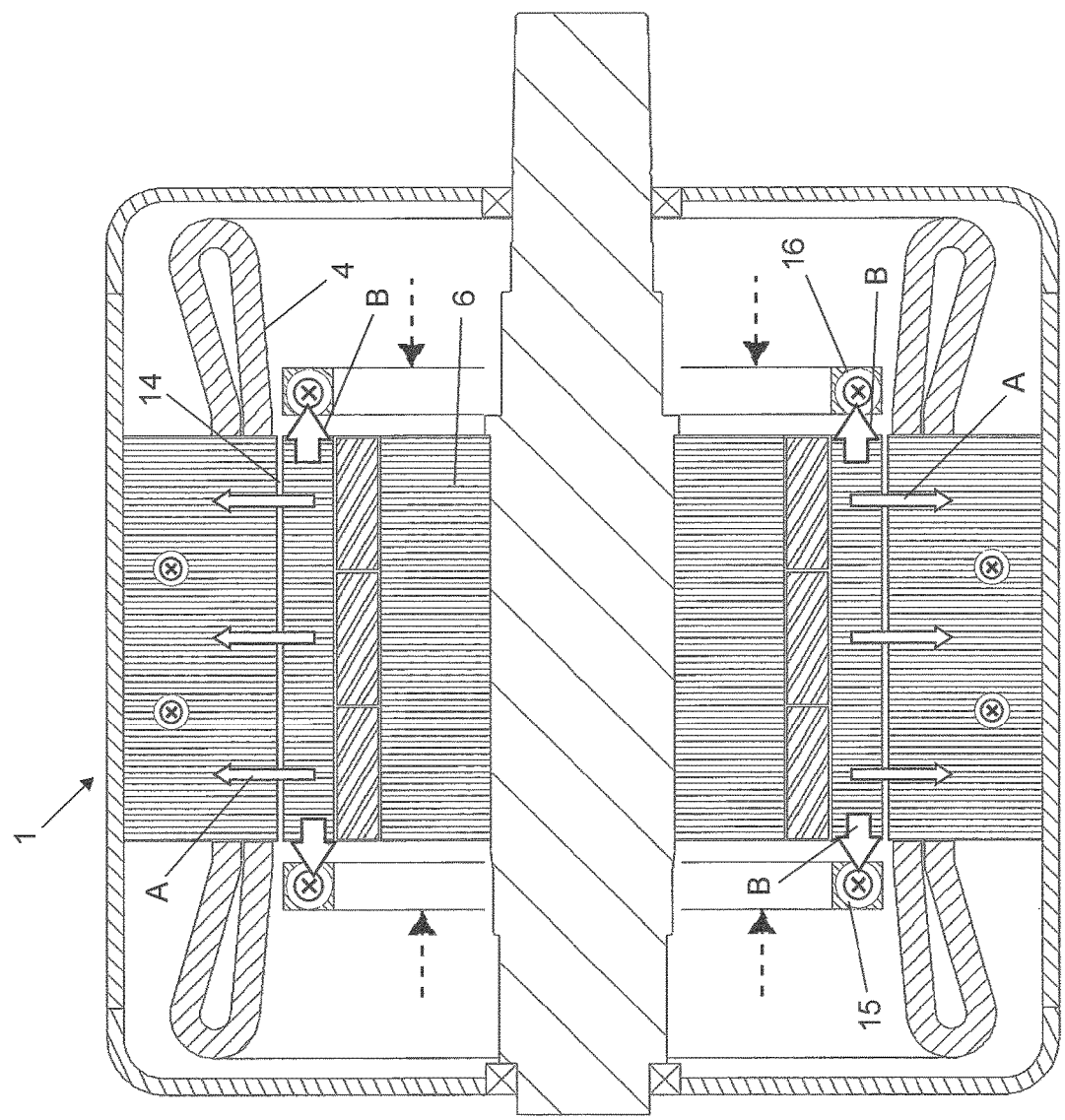
FIG. 3 is a view of the electric machine shown in FIG. 1 with said rings in a second position diverting a larger part of magnetic flux therethrough.

It is shown in FIG. 1 that the rotor 5 is disposed with an air gap 14 between the rotor body 6 and the stator body 3 and to make a magnetic flux to pass between the permanent magnets of the rotor body and the stator poles of the stator body through this air gap so as to apply a driving torque to a rotor in motor operation of the electric machine and feeding electric power to the stator winding in generator operation of the electric machine. This magnetic air gap flux is illustrated by the solid arrows A in FIG. 1. The electric machine further comprises a ring 15, 16 of a material having a high magnetic permeability positioned concentrically around the rotation axis 7 of the rotor with respect to the rotor body at each end of the rotor. These rings 15, 16 are made of laminated magnetic steel or soft magnetic composites and are configured to divert magnetic flux from the permanent magnets to be led through this ring instead of through said air gap as illustrated by the dashed arrows B in FIG. 1. These rings are movable with respect to the rotor body between at least two different positions in which they are configured to divert differently large proportions of said magnetic flux from the permanent magnets therethrough, and it is illustrated in FIG. 3 how the rings 15, 16 has been moved closer to the rotor diverting larger proportions of said magnetic flux from the permanents magnets as illustrated by the arrows B now being solid, so that the air gap magnetic flux is remarkably reduced as illustrated by the arrows A now being dashed. The movability of the rings may be realized in any conceivable way, such as for instance through threads, and the moving of the rings may be achieved manually or by means 70 arranged in the electric machine. Such control means may then be temperature dependent and configured to move the rings closer to the rotor body for diverting an increased portion of magnetic flux therethrough upon a decreasing temperature thereof. These control means may also be configured to move the rings to a position with a maximum reduction of magnetic flux through the air gap 14 upon creation or arcing or a short-circuit in the stator winding 4 or any cables or equipment connected to the stator winding 4.

Figure 4B:
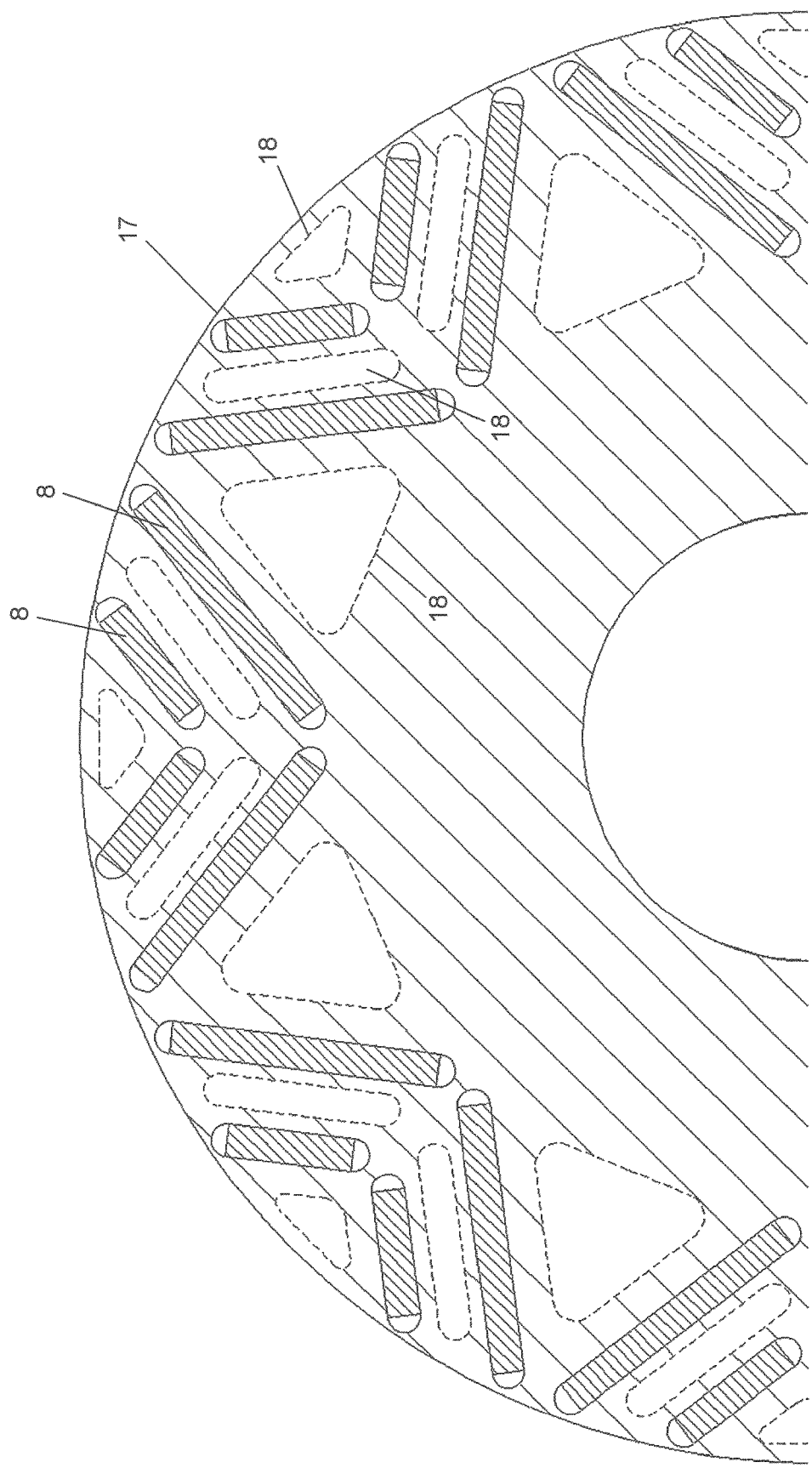

FIGS. 4a and 4b illustrate schematically how each non-magnetic press plate 17 at each end of the rotor can be designed to increase the effect by inserting pieces 18 of high permeability material into the press plate to lower the reluctance of the leakage path to the respective laminated steel ring 15, 16.

Figure 7:
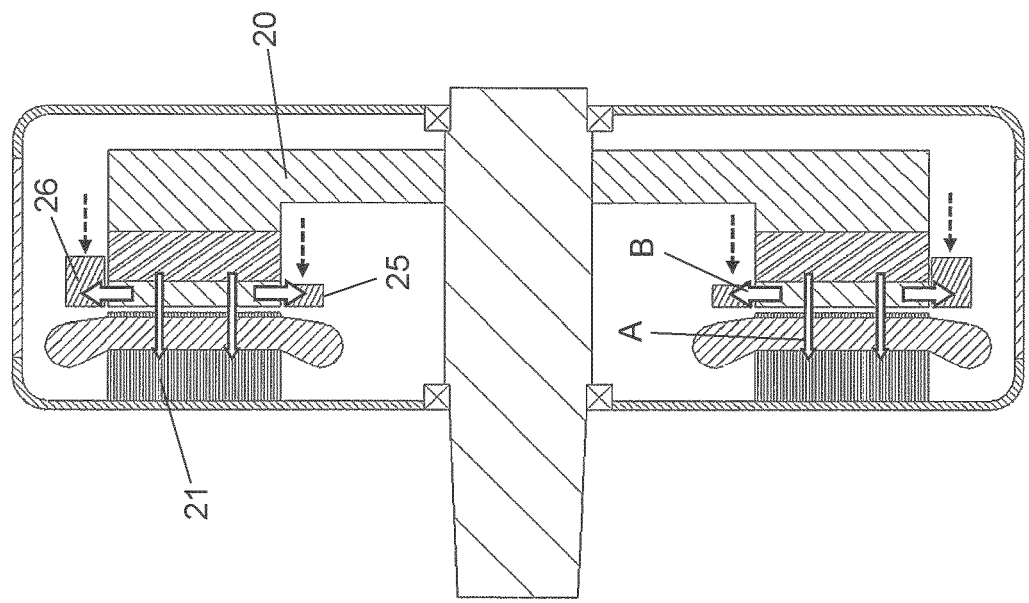
FIG. 7 is a view corresponding to FIG. 5 with said rings in an active position diverting magnetic flux to go therethrough instead of through a said air gap of the electric machine.
Figure 5:
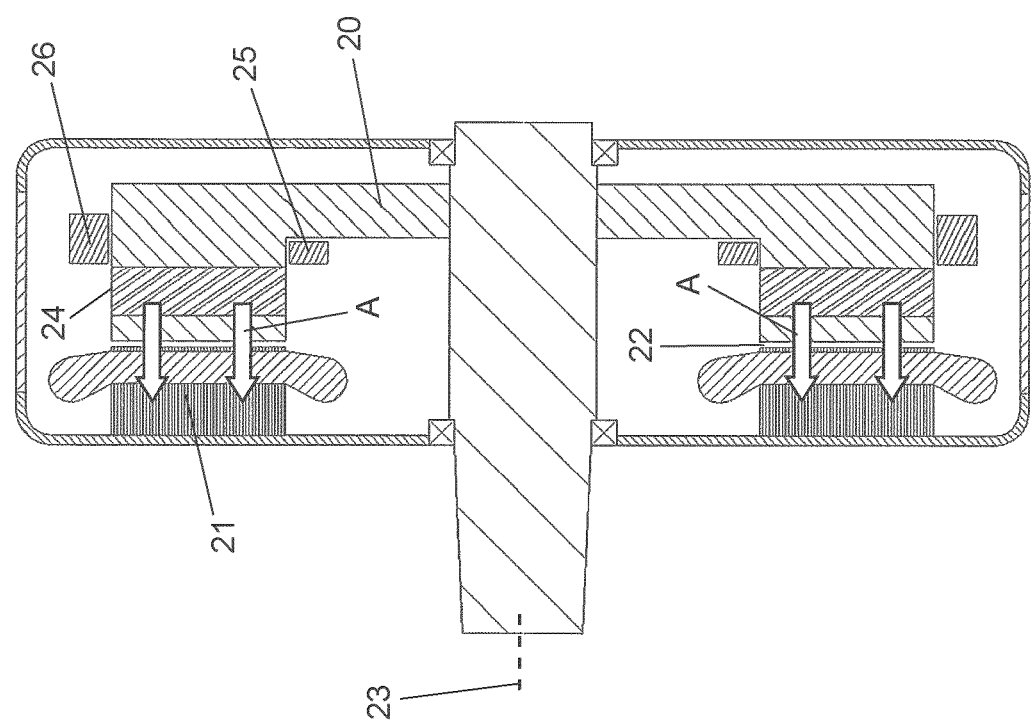
FIG. 5 is a view corresponding to FIG. 1 of an electric machine in a single sided axial flux configuration according to a second embodiment of the invention in which rings for diverting magnetic flux from the permanent magnets of the rotor body are arranged in a first position in which they are inactive.
Figure 6:
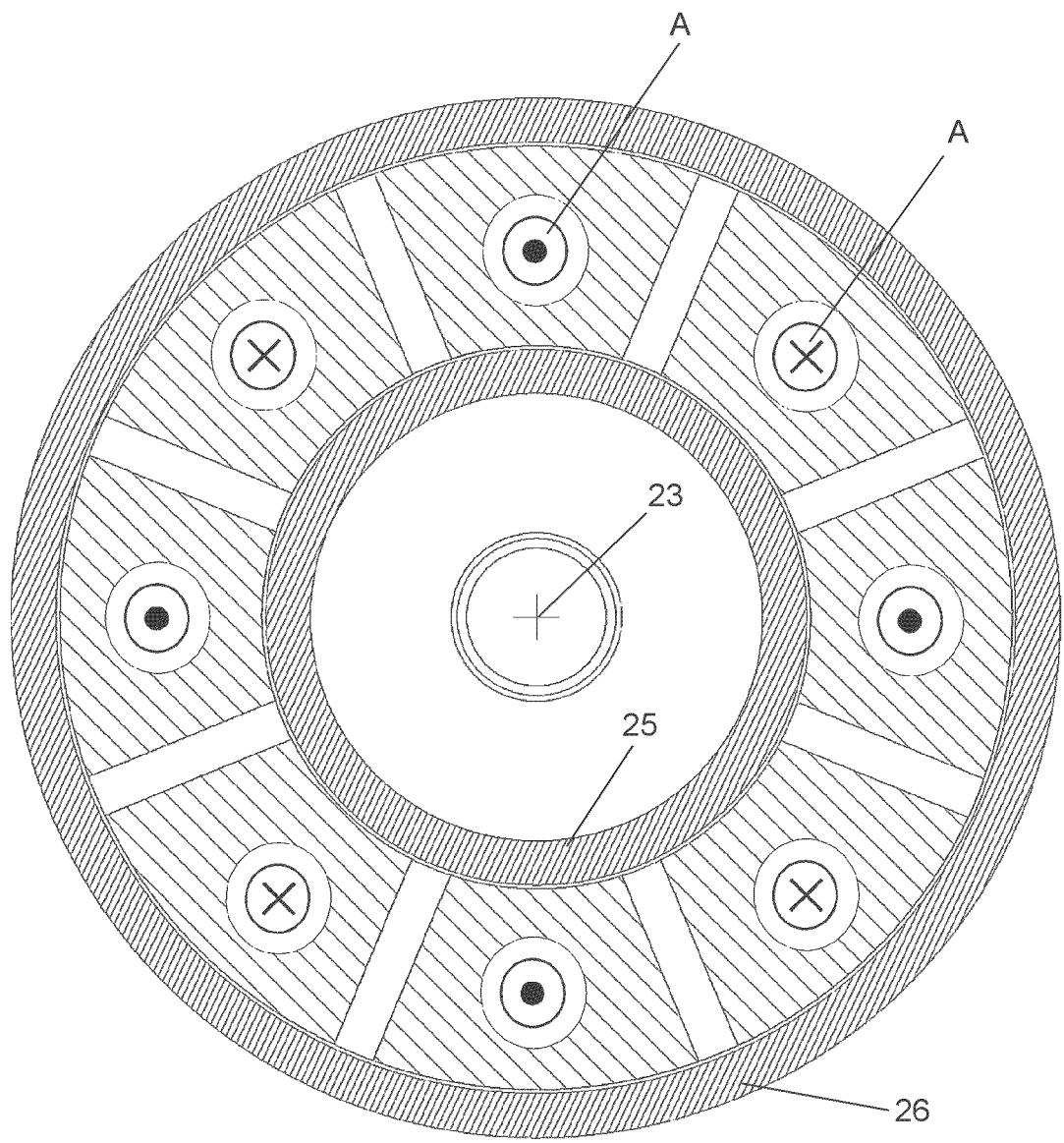
FIG. 6 is a transversal cross-section view of the electric machine shown in FIG. 5.
Figure 8:
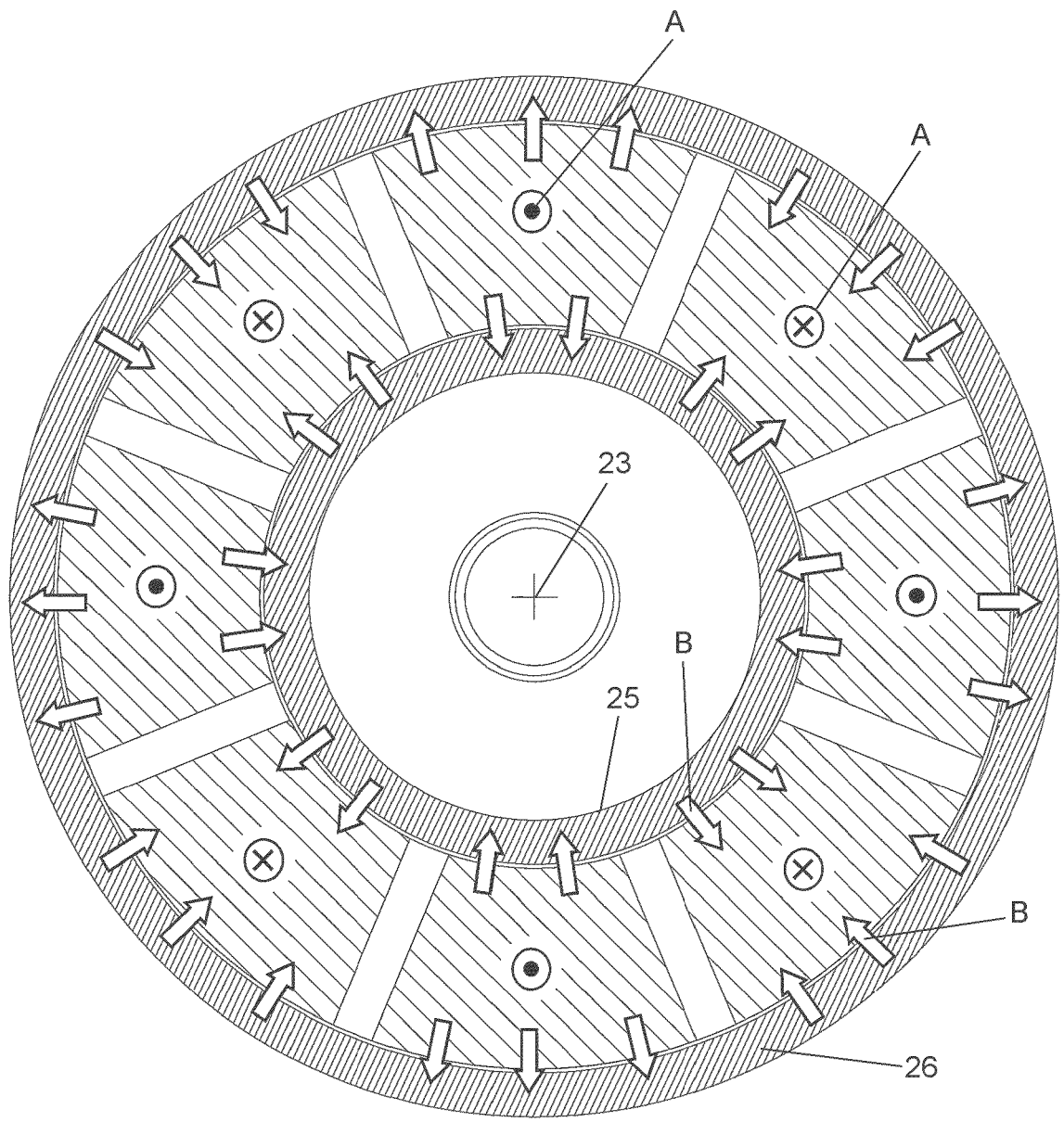
FIG. 8 is a view corresponding to FIG. 6 showing how magnetic flux is diverted through said rings in the position shown in FIG. 7.

FIGS. 5-8 illustrates schematically an electric machine according a second embodiment of the invention in the form of a so-called single sided axial magnetic flux machine having the rotor body 20 and the stator body 21 arranged to have said air gap 22 directed axially therebetween with respect to the rotation axis 23 of the rotor. The rotor body has here an annular part 24, and a said ring 25, 26 of a material with a high magnetic permeability is arranged along and within said annular part 24 and along and outside this annular part of the rotor body. It is shown in FIGS. 5 and 6 through the arrows A how magnetic flux from the permanent magnets in the rotor is led through said air gap and is comparatively high, since the rings 25, 26 are in a position in which they are not able to divert any noticeable part of the magnetic flux from the permanent magnets therethrough. However, the rings 25, 26 are movable axially with respect to the rotation axis of the rotor with respect to the rotor body towards and away from the air gap 22 for diverting differently large proportions of said magnetic flux from the permanent magnets therethrough, and it is shown in FIGS. 7 and 8 how the rings have been moved to a position in which a rather high proportion of the magnetic flux from the permanent magnets (see arrows B) is diverted to go through the rings instead of through said air gap.

Figure 9:
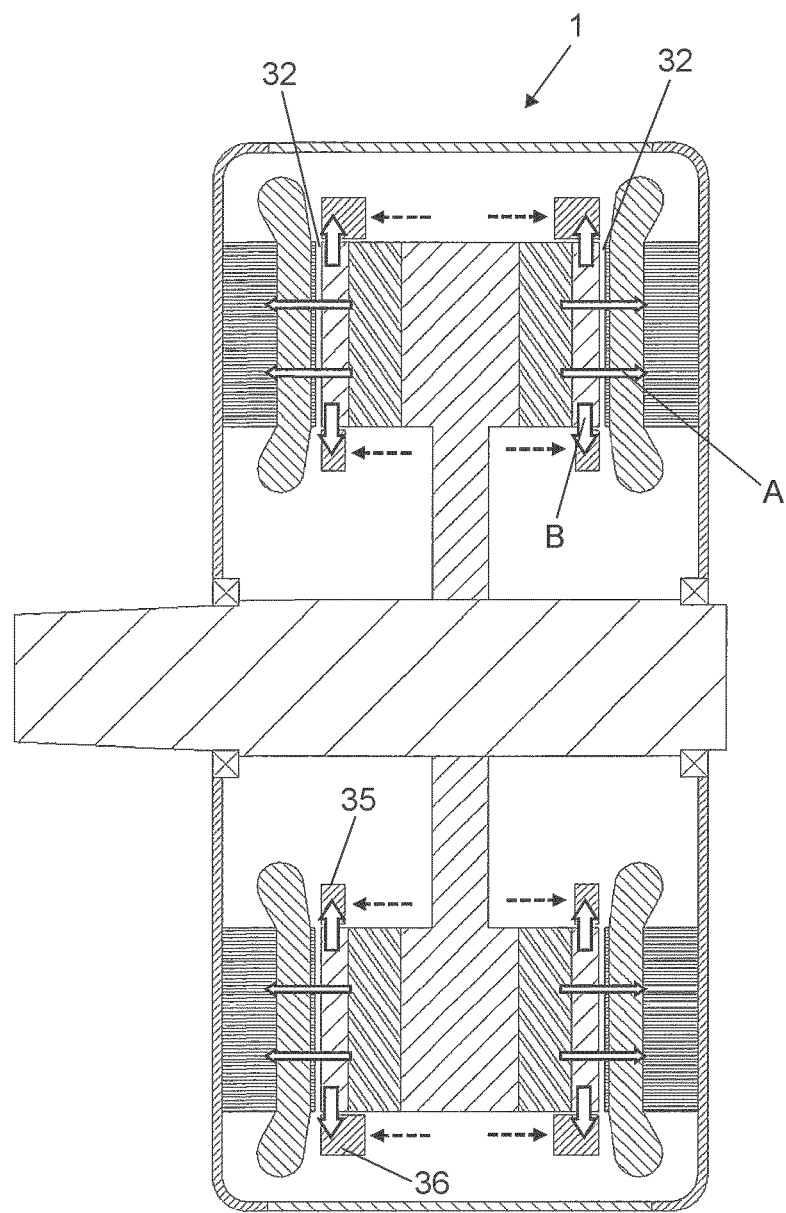
FIG. 9 is a view corresponding to FIG. 7 of an electric machine in a double sided axial flux configuration according to a second embodiment of the invention with said rings in an active position diverting magnetic flux from the permanent magnets otherwise led through said air gap.

FIG. 9 illustrates schematically an electric machine according to a third embodiment of the invention having a similar design as that shown in FIGS. 5-8 with the difference that this electric machine is a double sided axial flux permanent magnet machine instead of a single sided such. The rings 35, 36 are here shown in a position corresponding to that in FIG. 7 of diverting a considerable proportion of the magnetic flux from the permanent magnets to go through these rings instead of through the air gaps 32.

Figure 10:
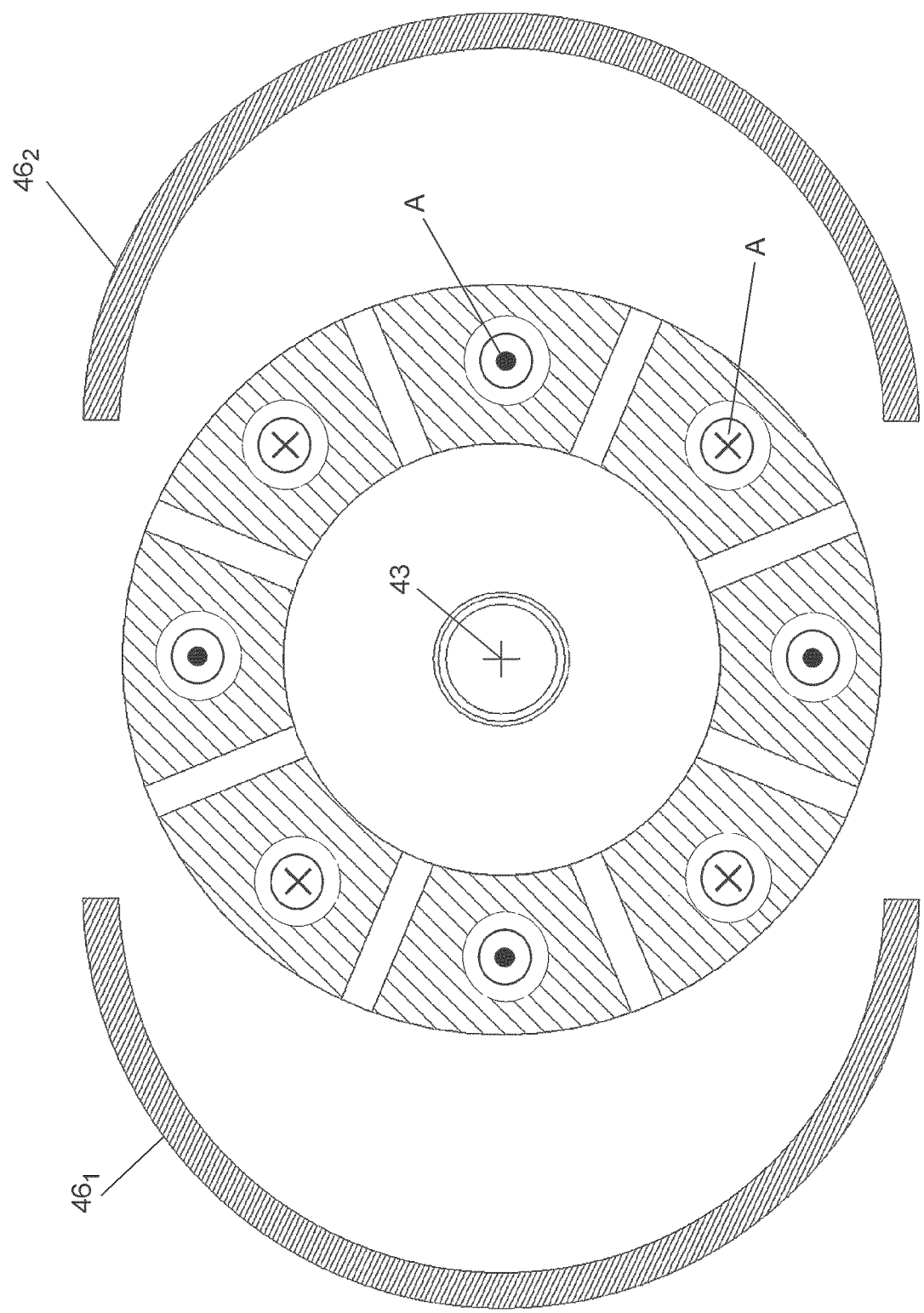
FIGS. 10 and 11 illustrates schematically a part of an electric machine according to a fourth embodiment of the invention where the outer ring is divided in two parts moved radially for diverting the flux.
Figure 11:
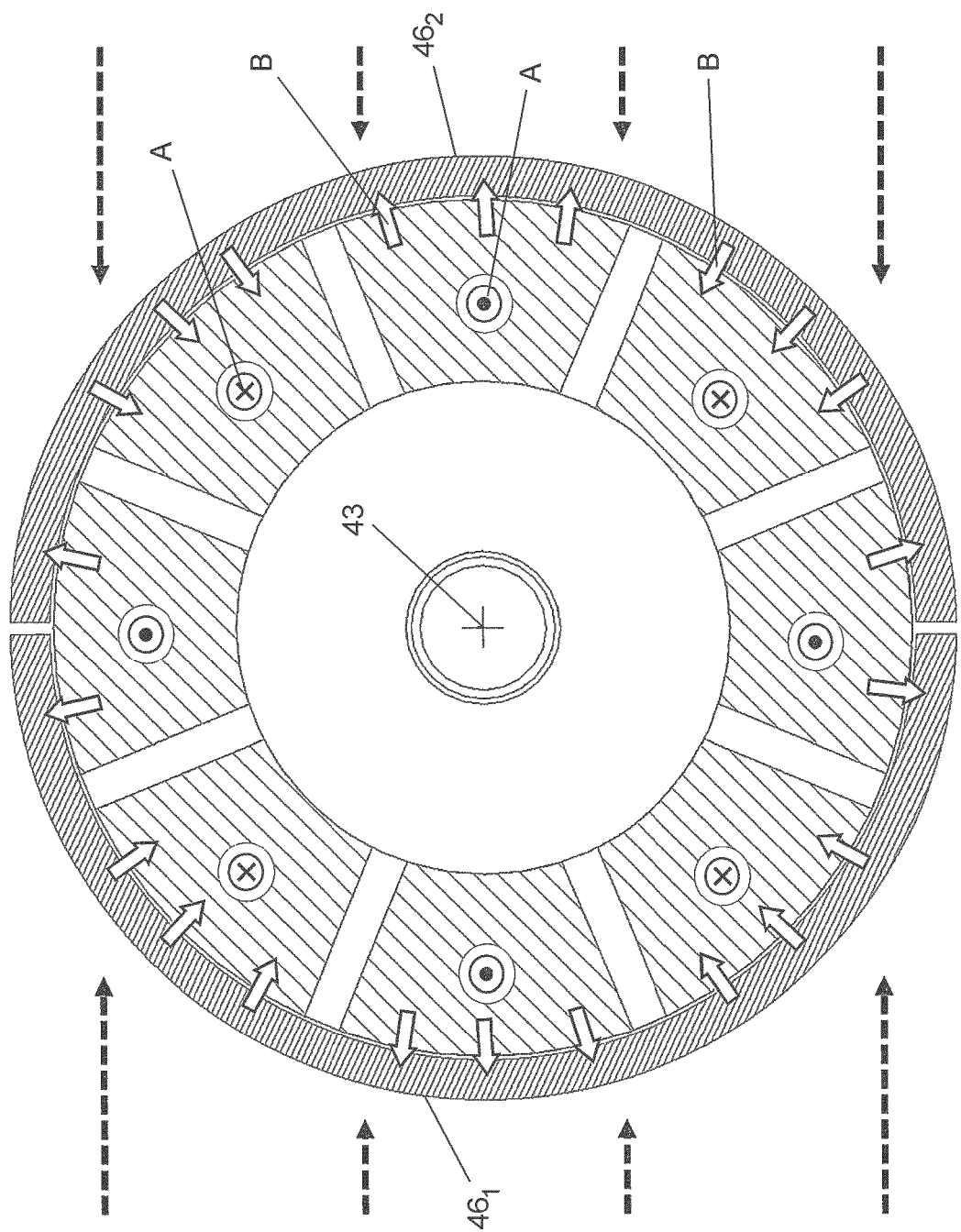

FIGS. 10 and 11 illustrate schematically an electric machine according to a fourth embodiment of the invention, also in the form of an axial flux electric machine, but in which the outer ring 46 is split in two parts 46$_1$ and 46$_2$ movable radially with respect to the rotation axis 43 of the electric machine. In the position shown in FIG. 10 the permanent magnet air gap flux A will be high, whereas in the position of the ring parts 46$_1$, 46$_2$ shown in FIG. 11 this magnetic air gap flux A will be lower and a considerable part of the magnetic flux from the permanent magnets will be led through the ring instead as illustrated by the arrows B.

Figure 13:
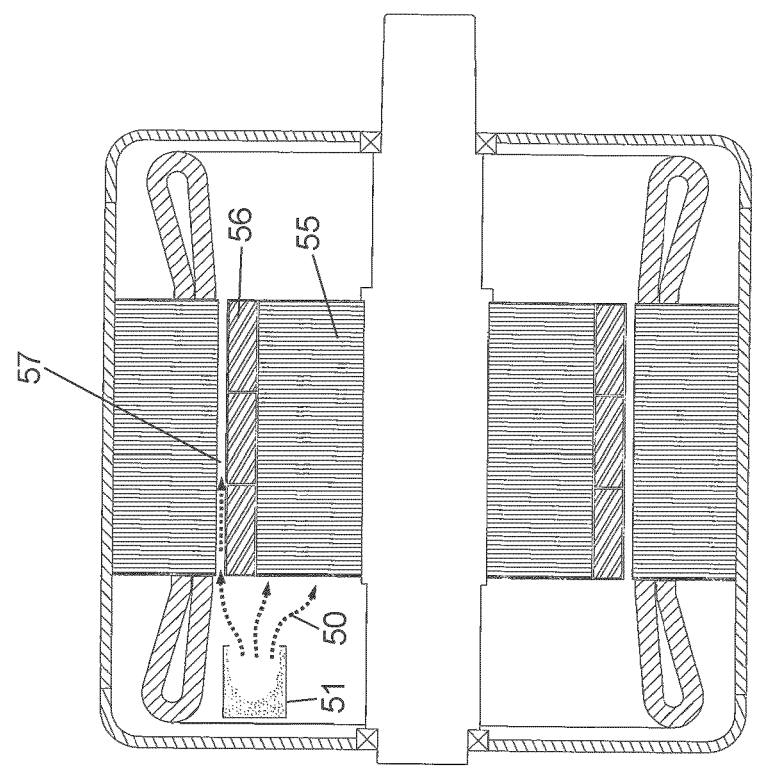
FIG. 13 is a view of the electric machine shown in FIG. 12 illustrating how said member is transferred into an active state.
Figure 12:
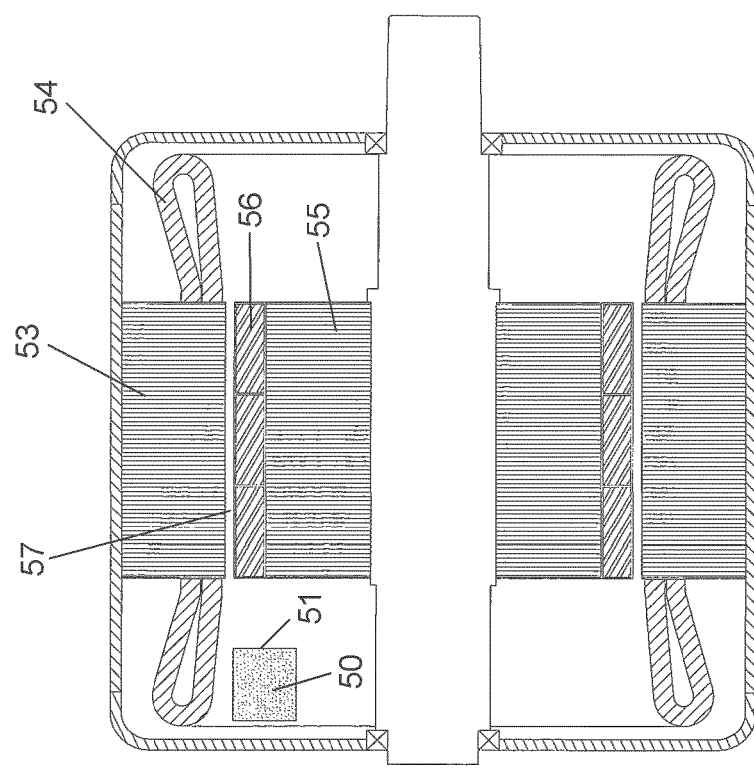
FIG. 12 is a simplified longitudinal cross-section view of an electric machine according to a fifth embodiment of the invention with a said member for reduction of the magnetic flux from the permanent magnets of the rotor of the machine in an inactive state.
Figure 15:
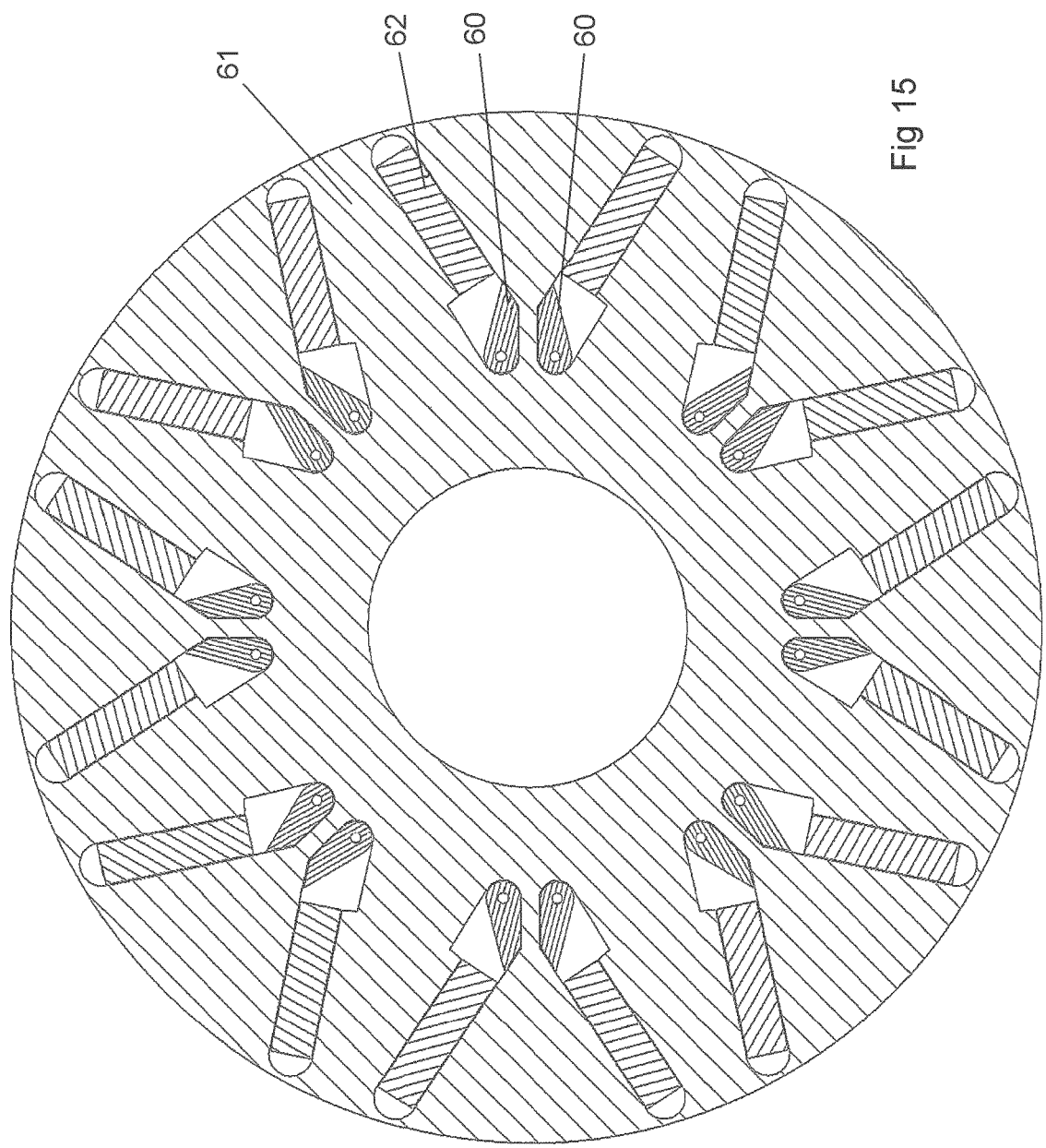
FIG. 15 is a view corresponding to FIG. 14 where the moveable members are in a position to divert more flux by leakage.
Figure 16:
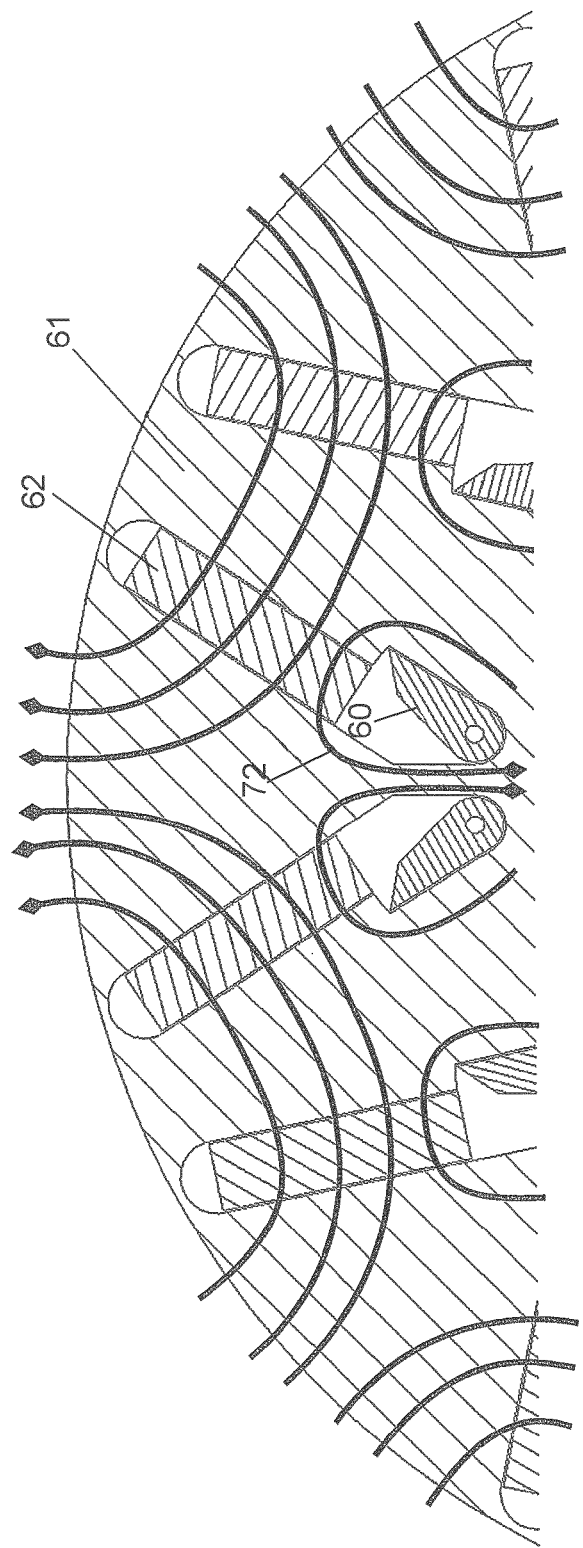
FIG. 16 is principal sketch of the flux in the rotor corresponding to FIG. 14 where the moveable members are in a position to divert less flux by leakage.
Figure 17:
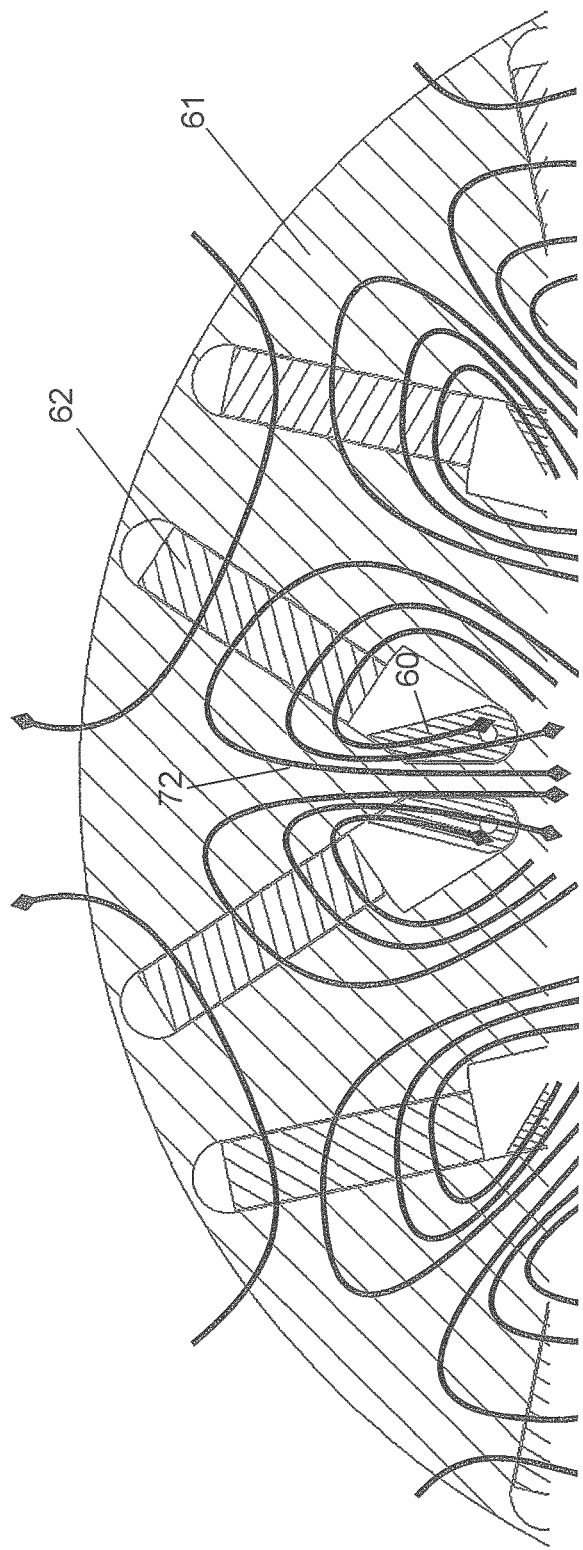
FIG. 17 is principal sketch of the flux in the rotor corresponding to FIG. 14 where the moveable members are in a position to divert more flux by leakage.

FIGS. 12 and 13 illustrate an electric machine according to a fifth embodiment of the invention having a said agent in the form of a ferromagnetic powder 50 stored in a container 51 inside a casing 52 enclosing the stator 53 with the stator winding 54 and the rotor 55 with the permanent magnets 56 and configured to be released as shown in FIG. 13 upon occurrence of arcing to reach the region of the air gap 57 for reducing magnetic flux through the air gap by bridging magnetic poles of the permanent magnets of the rotor.

An option is to use iron as said powder 50 inside the container 51, and the size of the grains is then small, preferably between 0.1 mm and 5 mm. Powder made of iron bears the risk of building iron oxide would moisture enter the container, which would cause lumping of iron grains. One possibility to solve this problem is to coat the iron grains, for instance with paint, plastic, etc. for avoiding oxidation and said lumping. As an alternative or additionally means to keep the container free of moisture may be arranged, and such means may produce an over pressure or including heating elements or a dryer. The container may also be hermetically sealed to avoid said moisture problem. Other ferromagnetic materials, such as ferritic stainless steel or martensitic stainless steel, which are chemically inert may also be used for preventing lumping so as to omit the use of said means to keep the container free of moisture.

Furthermore, the container is preferably made of a non-conductive material, such as wood, paper, glass or plastic. Would the container instead be made of a conductive material that would necessitate a means to blow/suck said ferromagnetic powder into the air gap, since magnetic field of the rotor/stator is not able to enter the container.

The container will be locked or hermetically sealed under normal operation conditions and be opened upon occurrence of arcing. Any type of electrical, chemical or mechanical actuating means may be used for achieving this.

Means to detect the occurrence of arcing might also be present and then preferably arranged inside the casing 52. Such means could be any type of sensor able to detect an arc, such as a light sensing device, a magnetic sensing device, an active oxygen ($O_3$) detecting device of any type. Such a device is preferably arranged close to the air gap.

Means may also be arranged outside the electric machine and connected to at least one electric phase line of the machine to detect any kind of disturbance apparent in the electric current or voltage when the electric machine is empowered and arcing appears. Other options to detect arcing are measuring of other electrical parameters, such as resistance, capacitance and/or inductance.

Furthermore, means for sensing the occurrence of arcing would be connecting to a control device, which is able to control the aforesaid opening/release of the ferromagnetic powder in case of arcing.

Finally, FIG. 14-17 illustrate very schematically a part of an electric machine according to a sixth embodiment of the invention in which rods 60 of high permeability material are pivotally arranged inside the rotor 61 and movable with respect to permanent magnets 62 of the rotor so as to change the magnetic flux through the air gap by varying how much of the magnetic flux from the permanent magnets is lost in the rotor body to leakage. More exactly, in case of arcing the rods of high permeability material 60 will pivot to increase the iron bridge so that more of the magnetic flux 72 is lost to leakage. This embodiment is also provided with means to detect the arcing as in the other embodiments of the invention and a control device to control the movement of the pivot elements (rods 60) upon arcing. The pivoting rods 60 may be held by for instance a short pin or another suitable member in the normal operation position shown in FIG. 14. When magnet flux reduction is needed the pivoting rods 60 will be released from the holding action of said pins and then through centrifugal force be influenced to pivot towards the magnetic flux reducing position shown in FIG. 15. The centrifugal force will ensure that the rods assume that position at least at high rotation speed of the rotor, i.e. when the magnetic flux reduction is really needed. It does not matter if some or all of the rods are in an in-between or in the normal operation position shown in FIG. 14 at low and medium speed once released.

The invention is of course not in any way restricted to the embodiments described above, but many possibilities to modifications thereof will be apparent to a person with ordinary skill in the art without departing from the scope of the invention as defined herein.

It is within the scope of the present invention to have said at least one member of a material having a high magnetic permeability configured to be positioned with respect to the rotor body so as to produce the magnetic flux from the permanent magnets through said air gap to be arranged in a fixed position when manufacturing the electric machine without any possibility to change this position even when the electric machine is not in operation, although it may in many cases be advantageous to be able to move said member so as to change the proportion of magnetic flux diverted therethrough.

The invention claimed is:

1. An electric machine comprising:
   a stator (2) having a stator body (3) with a stator winding (4) wound therearound and configured to electrically create a plurality of stator poles disposed around the periphery of the stator body,
   means (10) configured to connect the stator winding to an AC source or receiver (13), and
   a rotor (5) rotatably disposed with respect to the stator and having a rotor body (6) with a plurality of permanent magnets (8) received therein, said rotor being disposed with an air gap (14) between the rotor body (6) and the stator body (3) and to make a magnetic flux to pass between the permanent magnets of the rotor body and the stator poles of the stator body through said air gap to apply a driving torque to the rotor in motor operation of the electric machine and feeding electric power to the stator winding in generator operation of the electric machine,
   the machine further comprising at least one member (15, 16, 25, 26, 35, 36, 46, 60) or an agent (50) of a material having a high magnetic permeability configured to be positioned with respect to the rotor body (6) to reduce the magnetic flux from the permanent magnets through said air gap (14) by diverting a part of the magnetic flux otherwise led from the permanent magnets through said air gap to instead be led through this member or agent,
   said member or agent (15, 16, 25, 26, 35, 36, 46, 50) being moveable with respect to the rotor body (6) between at least two different positions in which the member or agent is configured to divert differently large proportions of said magnetic flux from the permanent magnets therethrough,
   the electric machine further comprising means (70) configured to move said at least one member between said different positions with respect to the rotor body (6),
   said means (70) being configured to move said at least one member or agent (50) to a position with respect to the rotor body with a maximum reduction of magnetic flux through said air gap upon creation of arcing or a short-circuit in said stator winding or any cables or equipment connected to said stator winding, and
   said agent comprising ferromagnetic powder (50) stored in a container (51) inside a casing (52) enclosing the stator (53) and the rotor (55) and configured to be released upon occurrence of arcing to reach the region of said air gap (57) for reducing magnetic flux through the air gap (57) by bridging magnetic poles of the permanent magnets (56) of the rotor.

2. Method for generating a traction force of a track-bound vehicle, comprising using the electric machine according to claim 1 in a driving arrangement therefor.

3. A track-bound vehicle having a driving arrangement for generating a traction force of the vehicle including at least one electric machine according to claim 1.

* * * * *